Patented July 4, 1950

2,513,287

UNITED STATES PATENT OFFICE 2,513,287

PROCESS OF TREATING ACONITIC ACID-CONTAINING PLANT EXTRACTS

Donald Walter Collier, Philadelphia, Pa., assignor to The Sharples Corporation, a corporation of Delaware No Drawing. Application September 16, 1948, Serial No. 49,638

15 Claims. (Cl. 260—527)

1

The present invention relates to a novel process for the recovery of aconitic acid values from natural aconitic acid-containing plant extracts.

Aconitic acid is the tribasic acid $$COOH \cdot CH_2 \cdot C(COOH) : CH \cdot COOH$$

found in plant juices such as raw sugar cane juice, raw sorghum juice, liquid products thereof such as molasses, various by-products thereof such as the distillery residues resulting from the fermentation of cane molasses, and the like. In these various plant extracts, a portion of the aconitic acid, usually less than 50%, exists as alkaline earth metal salts, mainly the calcium salt, with minor amounts of the magnesium salt, or double aconitic acid salts of calcium and magnesium. That is to say, in the plant extracts there exist calcium and magnesium ions, but due to the low pH of the extract insoluble aconitic acid salts thereof do not precipitate out. The amount of aconitic acid, both free and combined present in such juices varies widely, for example in Grade B and C molasses, the most frequently employed source of aconitic acid, the content of aconitic acid therein ranges from between about 0.9% and about 5.5% based on the solids remaining after 2 or 3 strikes of sugar have been taken. The recovery of the aconitic acid values from these plant extracts has become increasingly important in recent years for many reasons. In the first place, the presence of the aconitic acid, both free and combined, in the juices represents an undesirable impurity especially when the juices are to be worked-up into edible products. For instance, it often interferes with the satisfactory recovery of sugar. In the second place, aconitic acid and the salts and esters thereof are finding increasing utility in various fields, for example, aconitic acid and salts and esters thereof are useful as plasticizers in synthetic plastics and rubber and the water-soluble aconitic acid salts are valuable as surface active agents. The commercial use of aconitic acid and its derivatives represents one of the principal reasons for the recovery of aconitic acid values from aconitic acid-containing plant extracts.

Processes for the recovery of aconitic acid values from plant extracts have been proposed from time to time. These processes are based on the belief that the mixed calcium-magnesium aconitate corresponding to the formula $$Ca_2Mg(aconitate)_2$$

represents the least soluble salt of aconitic acid containing calcium or magnesium or

2 combinations thereof, and require the precipitation of aconitic acid by the addition of soluble calcium and magnesium salts to the extracts which have been neutralized. These processes, however, leave much to be desired from the standpoint of recovery of high yields of the aconitic acid values. For instance, in the commercial operation of the better of these processes, less than half of the aconitic acid content of the plant extracts is precipitated. Moreover, the aconitates precipitated by that process are in such a form as to be very difficultly removable from the liquid extract.

It is, therefore, a principal object of the present invention to provide an improved commercial process for the recovery of aconitic acid values from aconitic acid-containing plant extracts.

Another object is to provide a commercial process for the recovery of aconitic acid values from aconitic acid-containing plant extracts wherein higher proportions of aconitates are precipitated than by prior processes.

A further object is to provide a simple and economical process for the recovery of aconitic acid values from aconitic acid-containing plant extracts whereby not only high proportions of aconitates are precipitated, but the aconitates precipitated are in a form easily removable from the system.

Further objects will be apparent from a consideration of the following specification and the claims.

In accordance with the present invention, aconitic acid values are precipitated in the form of salts at least a portion of which are in the form of salts containing a metal selected from the group consisting of barium and strontium. In accordance with the process, there are provided in an aqueous solution of the aconitic acid-containing plant extract precipitating metal ions at least a portion of which are metal ions selected from the group consisting of barium and strontium, whereby aconitic acid values are precipitated as metal salts at least a portion of which contain barium and strontium, the pH of the extract being adjusted to provide a pH not lower than the substantially neutral range at least at the time the precipitated aconitates are removed from the extract. In accordance with the preferred embodiment, as will be more fully discussed hereinafter, the aconitic acid-containing plant extract is substantially neutralized with lime which provides a portion of the precipitating metal ions, and additional alkaline earth metal ions, at least a portion of which are barium and/or strontium ions, are supplied in the form of water-soluble salts thereof to the neutralized extract; and preferably calcium ions are supplied to the lime-neutralized aconitic acid-containing plant extract followed, after an aging period, by the addition of barium and/or strontium ions. The precipitated aconitates thus formed may then be removed from the plant extract.

By the present process, there is provided a simple and economical process whereby higher proportions of aconitic acid values contained in plant extracts can be precipitated than heretofore. High yields of recoverable aconitates may even be obtained by the use of substantially less precipitating agent than has been employed previously. For example, in many cases, the addition of calcium and barium ions in amounts to provide 50% and 20%, respectively, of that theoretically required for complete combination with the three carboxyl groups of the aconitic acid, will precipitate as much of the aconitic acid values, as will the addition of calcium ions alone equivalent to 100% of that theoretically required. In other words, due to the complex nature of the extract there is a limiting residual amount of aconitic acid which remains in solution therein which cannot be materially lowered by the addition of excessive amounts of calcium and/or magnesium ions over that theoretically required. However, a relatively small addition of barium and/or strontium ions will make a substantial reduction in the amount of aconitic acid remaining in solution. In addition, in accordance with the preferred embodiment wherein calcium ions are added to the lime-neutralized extract followed, after an aging period, by the addition of barium and/or strontium ions, the particle size of the precipitated aconitates formed is larger than that formed by conventional procedures, providing a precipitate more easily recovered from the liquid medium.

As indicated previously, aconitic acid-containing plant extracts which may be treated for the recovery of aconitic acid values in accordance with the present invention, may be obtained from various sources. For example, raw sugar cane juices or raw sorghum juices may be treated, as well as various by-products such as, for example, distillery residue, i. e., the residue from the fermentation of cane molasses. Juices expressed from the leafy green portion of sugar cane, sorgo, and other grass-like natural materials are also often high in aconitic acid and may be treated in accordance with the present invention. Usually, however, the material treated will be a molasses, and it is relatively immaterial from the standpoint of the process whether the molasses treated is the A, B, or C ("Blackstrap") grade; i. e. whether 1, 2, or 3 strikes of sugar have been taken therefrom. All such liquids containing aconitic acid will be referred to herein as aconitic acid-containing plant extracts.

The quantity of aconitic values in various plant extracts depends, of course, upon the source thereof. The amount of aconitic acid present in any specific extract may be determined, however, by following the procedure set forth on page 118 of "Analytical Chemistry," volume 19, 1947. In accordance with the procedure there outlined, a small sample of the extract, which by experience is selected to contain not more than about 1 gram of aconitic acid, is adjusted to a pH of 6–6.2 with sodium hydroxide and a Brix of about 50°–55°. 40 ml. of a saturated, neutral lead acetate solution, which will always be a large excess is then added. The precipitate formed is filtered on filter paper fortified with a layer of asbestos. The precipitate is washed with distilled water, followed with acetone, and this washing procedure is repeated. The filter paper containing the precipitate is then dried for one-half hour at 100°–105° C. The paper containing the precipitate is then transferred to a decarboxylation flask to which are also added 100 ml. of glacial acetic acid, 10 grams of potassium acetate, and boiling chips. The outlet of the flask is connected to an absorption flask containing a measured quantity of sodium hydroxide solution. Carbon dioxide-free air is passed through the flask for 20 minutes to purge the system of $CO_2$, then the mixture is refluxed for one hour. The $CO_2$ liberated by the refluxing mixture forms, in the absorption flask, sodium carbonate. After refluxing, barium chloride is added to the absorption flask to precipitate the sodium carbonate as barium carbonate, and the remaining sodium hydroxide is titrated with a standard hydrochloric acid solution to determine the quantity of $CO_2$ liberated. For each mol of aconitic acid present, one mol of carbon dioxide is liberated, and thus the quantity of aconitic acid, both free and combined, in the sample may be calculated.

Advantageously, the specific gravity of the aconitic acid-containing plant extract will be adjusted to insure maximum concentration of aconitic acid values and insolubility of the aconitates precipitated therein consistent with workability of the liquid. This may require concentration or dilution depending upon the type of extract. For example, the raw juices may be concentrated by conventional procedures while molasses may be diluted. With a specific gravity in the aconitic acid-containing plant extract to be treated corresponding to between about 45° and about 60° Brix, and preferably between about 50° and about 55° Brix, the growth and recovery of the precipitated aconitate crystals are facilitated; and maximum concentration and insolubility thereof consistent with satisfactory handleability of the liquid medium in the subsequent centrifugal operations are insured.

As indicated previously, the aconitic acid-containing plant extract is adjusted to provide a pH within the substantially neutral range at least by the time the aconitates are removed from the extract. At pH's on the acid side of the neutral range, the metal aconitates exhibit increasing solubility in the medium, while at pH's on the basic side of the neutral range, there is danger that during heating, any sugar in the extract that is to be subsequently recovered may be deleteriously affected. Thus the pH of the aconitic acid-containing plant extract is adjusted sometime prior to the removal of the precipitated aconitates to insure a pH of the extract not lower than the substantially neutral range, and, if sugar is to be subsequently recovered, within the substantially neutral range, that is between about 6 and about 8, and preferably between about 6.5 and about 7. While the pH of the extract may be initially adjusted to within these ranges, it may, at times, be advisable to adjust the pH thereof to a point slightly higher than the neutral range to compensate for the acid nature of certain of the water-soluble precipitating agents subsequently added. On the other hand, the neutralizing agent may be added to the extract after the precipitating agent has been added thereto. In any event, as stated, the pH of the extract will be adjusted to provide a pH, at least at the time the precipitated aconitates are removed from the extract, not lower than the substantially neutral range as above set forth.

While any basic material, which is capable of raising the pH of the extract to the extent desired may be employed, such as the alkali metal oxides and hydroxides, the alkaline earth metal oxides and hydroxides, ammonia, and the like, the use of lime, either slaked or unslaked, is particularly advantageous. Lime not only is a relatively cheap material but also, when used as a neutralizing agent in the present process, provides some of the metal cations required for precipitation of the aconitic acid. As has been indicated, a portion of the aconitic acid value in the natural plant extracts exists as calcium and magnesium salts or as mixed calcium and magnesium salts, and since the free aconitic acid is a weak acid, when the plant extracts of the type described are substantially neutralized, the cations added by the neutralizing agent correspond to on the order of 20% of that theoretically required for complete combination with the three carboxyl groups of the acid. If a base containing precipitating metal ions, such as lime, is used as the neutralizing agent, the quantity of metal ions added will be taken into consideration in determining the quantity of precipitating agent that is to be added. The neutralizing agent may be added to the plant extract in solid form or in the form of a suspension or solution, and the amount added will, of course, be sufficient to insure a pH within the substantially neutral range as set forth. Neutralization may be carried out at any temperature below the boiling point of the extract when care is exercised in adding the neutralizing agent. However, due to localized high pH's at the point of introduction of the neutralizing agent and the consequent danger of deleteriously affecting sugar at high temperature under such conditions, it is advisable that neutralization be carried out with the liquid plant extract at a moderate temperature, for instance, below about 55° C., and preferably between about 45° C. and about 50° C.

In accordance with the present invention, there is provided in the aconitic acid-containing plant extract precipitating metal ions at least a portion of which are metal ions selected from the group consisting of barium and strontium ions, in an amount to precipitate aconitic acid in the desired amount. While some of the precipitating metal ions may be supplied by the neutralizing agent when, for example, lime is employed, the precipitating metal ions are for the most part provided by water-soluble salts thereof. Examples of such salts are the halides, for instance, the chlorides and iodides; the formates; the nitrates; the nitrites; the acetates; and the like of calcium, magnesium, barium, and strontium. Preferably, from the standpoint of economy, the chlorides are employed. The salts providing the precipitating metal cations, including the barium and/or strontium cations, may be added to the extract in solid form or in the form of a water solution or dispersion thereof.

In accordance with the present process, as stated, at least a portion of the precipitating metal cations supplied to the extract is a metal cation selected from the group consisting of barium and strontium. Of these, barium is preferred. While the total amount of precipitating metal cation present in the extract may vary widely, it is generally desirable to have present at least 80%, and preferably at least about 90% of that theoretically required. While amounts in excess of that theoretically required, such as as high as 250%, may be present, no advantage is to be gained, and generally no more than about 200%, preferably no more than about 150%, of that theoretically required is present. While any of the mentioned metal cations, i. e., barium and strontium, or combinations thereof. may be employed as the sole precipitating agent, it is desirable for the sake of economy to employ one or more of these precipitating cations in conjunction with a less expensive but less efficient precipitating cation such as calcium and/or magnesium. The optimum benefits of the present process may thus be obtained when barium and/or strontium ions are supplied in an amount between about 5% and about 40%, preferably between about 8% and about 20%, of that theoretically required for complete combination with the three carboxyl groups of the aconitic acid, both free and combined, present in the extract, calcium and/or magnesium ions also being present in an amount to provide a total quantity of precipitating metal ions within the above set forth ranges. As indicated previously, the extract may, prior to neutralizing and the addition of the precipitating agent, already contain a portion of the calcium and/or magnesium ions required. The presence of some or all of these may be due to the fact that they naturally occur in aconitic acid-containing plant extracts. On the other hand, some of these may be present due to prior treatment of the extract, for instance in processing raw sugar juice for extraction of sugar therefrom limited quantities of lime are often used. As also pointed out previously, calcium and/or magnesium ions may also be added during neutralization in the event oxides or hydroxides thereof are employed as neutralizing agents. In any event, in accordance with the present invention, precipitating metal cations, at least a portion of which are the barium and/or strontium ions, are supplied in the form of water-soluble salts thereof to provide a total precipitating metal cation content in the extract within the ranges set forth above.

As indicated previously, the water-soluble salt or salts providing the precipitating metal cation in the required amount may be added to the extract either before or after the neutralization of the extract. Usually, however, the extract will be substantially neutralized at the moderate temperature referred to followed by the addition of the water-soluble salt or salts providing precipitating metal cations.

In accordance with the preferred process of the invention, the aconitic acid-containing plant extract is substantially neutralized with lime, and, as stated, this provides calcium ions in an amount of the order of 20% of that theoretically required for complete combination with the three carboxyl groups of the acid. In this embodiment, further precipitating metal cations are supplied in the form of the water-soluble salt or salts of the type referred to, at least a portion of which cations are metal cations selected from the group consisting of barium and strontium in an amount as above set forth, to provide a total precipitating metal cation content within the above-set forth range. Advantageously, this addition of further precipitating metal cations is accomplished by first adding a water-soluble calcium salt supplying additional calcium ions to the lime-neutralized extract, followed, after a period of aging as more fully discussed hereinafter, by the addition of the water-soluble salt or salts providing the barium and/or strontium ions. In this embodiment also, the quantity of barium and/or strontium cations, as well as the total quantity of precipitating metal cations that are present in the extract will be within the ranges hereinabove set forth.

Advantageously, the substantially neutralized extract in which the aconitates are precipitated is at an elevated temperature. Metal aconitates possess decreasing solubility as the temperature of the liquid medium increases. Thus, the use of an elevated temperature at the time of the precipitation of the aconitates insures the precipitation of larger and thus more easily removable crystals. The extract may be heated prior to, during, or immediately after the addition of the water-soluble salt, or salts, thereto, such as to a temperature between about 85° C. and the boiling point, and preferably between about 90° C. and about 95° C., and once the medium has been heated to the elevated temperature, the temperature of the liquid, as long as it is in contact with the aconitate precipitate, is not permitted to drop appreciably below about 85° C., and preferably not below about 90° C. Preferably, however, the extract is substantially neutralized at the moderate temperature referred to above, and the substantially neutralized extract is then heated to the stated elevated temperature followed by the addition of the water-soluble salt or salts providing the required amount of precipitating metal ions. The heating of the extract may be brought about by any desired means, such as by passing steam through the extract, or by the use of steam coils or other external heating means.

Upon supplying the precipitating metal cations to the neutralized extract, the corresponding aconitates become precipitated. The aconitates precipitated depend upon the precipitating metal cation or cations, and the proportions thereof. The precipitated aconitates may be the pure tri-salt of barium or strontium in the case one of these is used as the sole precipitating agent, or the precipitated product may be a mixture thereof or double salts containing combinations of barium and strontium. As is more generally the case, however, where less expensive but less efficient precipitating agents, such as calcium and/or magnesium ions, are present in the extract and are used in conjunction with the barium and/or strontium, the precipitated product will be mixtures of the corresponding aconitates or double salts of aconitic acid and combinations of one or more of the last-mentioned metals with the first mentioned calcium and/or magnesium.

The aconitates thus formed may then be removed from the extract by any desirable means. Preferably, however, to insure maximum precipitation as well as the precipitation of more easily removable crystals, the reacting mixture is allowed to stand or "age" for a short period of time before the separation of the precipitated aconitates therefrom. The reacting mixture will preferably be permitted to stand until no further significant crystal growth takes place. This period may be determined visually or may be more accurately determined by centrifuging samples under fixed conditions until no further significant increase in the proportion of precipitate recovered occurs with increasing crystallization time. Aging generally requires from about 15 minutes to an hour and a half, and usually between about 30 minutes to about 45 minutes will be sufficient.

With respect to the preferred embodiment of the process, wherein additional calcium ions are supplied to the lime-neutralized extract, followed by the addition of the barium and/or strontium ions, there is, as stated, a brief aging period between the time that the additional calcium ions are supplied and the time that the barium and/or strontium ions are added. This aging period is also to facilitate maximum crystal growth of the calcium aconitates by the time the barium and/or strontium ions are added. The time of aging in this case may also be determined in the same manner as that set forth above, that is by determining the time at which no further significant crystal growth occurs. This aging period also generally requires at least about 15 minutes, and usually between about 30 minutes and about 45 minutes will be sufficient. Similarly, in this embodiment, the reacting mixture is preferably allowed to stand after the addition of the barium and/or strontium ions, until no further significant crystal growth occurs. Preferably, during any or all the aging steps referred to above, the reaction mixture is maintained in a state of agitation to facilitate maximum crystal growth.

After the desired precipitation of the aconitates, and aging if employed, the precipitated aconitates may be removed from the extract by any desired means such as by filtration, settling and decantation, or centrifuging. Due to the fine nature of the precipitated aconitates, separation by the use of centrifugal force is the preferred method and any expedient used in that type of separation may be employed.

The process of the present invention provides many marked improvements over those processes previously practiced. In the first place, the salts of aconitic acid containing barium and/or strontium possess much less residual solubility in the complex mixture making up the plant extract than do the tri-calcium, tri-magnesium, or mixed calcium and magnesium aconitates. More important, however, is the fact that the presence of only relatively small proportions of barium and/or strontium ions in the aconitic acid-containing plant extract causes relatively high amounts of aconitic acid to precipitate in a less soluble form as compared to the use of the precipitating agents previously employed. Hence the use of a relatively small proportion of these precipitating cations in conjunction with, and in lieu of a portion of, the conventional precipitating agents, such as calcium and/or magnesium ions, provides a marked improvement in the yield of aconitates precipitated and a corresponding marked increase in the purity of the residual plant extract. The process provided by the preferred embodiment not only provides higher yields of precipitated aconitates but also provides a precipitate that is more easily separated from the liquid medium.

The effect of employing as at least a portion of the precipitating metal cations a metal cation selected from the group consisting of barium and strontium, and especially barium, may be readily seen from a consideration of the following tables. In Table I, a solution was made of aconitic acid in water, and the solution was neutralized to a pH of 6.7 with sodium hydroxide. In one test, calcium chloride was added to a sample of the solution in an amount to provide calcium ions stoichiometrically equivalent to 100% of that theoretically required for complete combination with the acid. In the other test, 10% equivalency of barium was added as barium chloride in place of 10% of calcium. The results are indicated as residual solubilities in the aqueous medium, that is, the amount of aconitic acid remaining in solution after precipitation.

*Table I*

| Chemical Addition | Solubility (g. Aconitic Acid/Liter) |
|---|---|
| 100% equivalence of Ca++ | 12.6 |
| 90% equivalence of Ca++ plus 10% equivalence of Ba++ | 3.1 |

In Table II, Louisiana "B" molasses was diluted to 52° Brix and adjusted to a pH of 6.8 with lime. The neutralized material was then heated to 93° C. and calcium chloride was added in an amount to provide additional calcium ions stoichiometrically equivalent to 50% of that theoretically required for complete combination with the acid. Increasing amounts of barium chloride were added to separate samples providing barium ions corresponding to 10%, 20%, and 40%, respectively, of that theoretically required for complete combination with the acid. The results are indicated as residual solubilities in the extract, that is the amount of aconitic acid remaining in solution in the molasses after the respective treatments based on the total weight of solids present in solution.

*Table II*

| Per Cent Equivalence of Ba++ | Solubility [1] |
|---|---|
| 0 | 2.30 |
| 10 | 1.85 |
| 20 | 1.72 |
| 40 | 1.45 |

[1] Per cent aconitic acid remaining in solution based on weight of solids.

The following examples are given as illustrations of the process of the present invention and are not to be considered as limiting the scope of the invention in any way.

*Example 1*

"B" molasses (Louisiana), containing 4.2% aconitic acid based on total solids, is diluted from 85° Brix to 55° Brix and treated with lime at a temperature of 50° C. to provide a pH of 6.8. The neutralized extract is then heated with live steam to 93° C. after which calcium chloride in the form of a 15% water solution, and in an amount stoichiometrically equivalent to 90% of the aconitic acid content, is added. The mixture was allowed to stand with agitation for 45 minutes during which time precipitation took place. Barium chloride in the form of a 15% water solution and in an amount stoichiometrically equivalent to 10% of the aconitic acid content is added. The resulting mixture is allowed to stand for an additional 45 minutes after which the precipitated aconitates are separated from the molasses liquor. The aconitates precipitated amount to 71.5% of the aconitic acid values present. An increase in purity on the order of 2½ points resulted in the molasses.

*Example 2*

"C" molasses from Cuban sugar cane, containing 2.7% aconitic acid based on total solids, is diluted from 87° to 55° Brix, and neutralized to a pH of between 6.5 and 7 as in the preceding examples. The neutralized molasses is then heated to 90° C., after which calcium chloride in an amount equivalent to 75% of the aconitic acid content of the molasses was added. After the mixture had aged for 1 hour with agitation, strontium iodide in an amount stoichiometrically equivalent to about 25% of the aconitic acid content is added. After a delay of about 1 hour, the precipitate consisting of calcium aconitate, strontium aconitate, and mixed calcium and strontium aconitates was separated from the molasses liquor.

Considerable modification is possible in the selection of the soluble salts providing the precipitating metal as well as in the details of the process without departing from the scope of the present invention.

I claim:

1. The process of recovering aconitic acid values from aconitic acid-containing plant extracts which comprises providing in said extract precipitating metal ions, in an amount between about 80% and about 250% of that theoretically required for complete combination with the aconitic acid, at least a portion of which precipitating metal ions is a metal selected from the group consisting of barium and strontium, in an amount between about 5% and about 40% of that theoretically required for complete combination with the aconitic acid, to precipitate aconitic acid values, at least a portion of which precipitated aconitic acid values is in the form of aconitic acid salts containing a metal selected from the group consisting of barium and strontium, and removing precipitated aconitic acid values from the extract, the pH of said extract being adjusted to provide, at least at the time the aconitic acid values are removed from the extract, a pH not lower than the substantially neutral range.

2. The process of claim 1 wherein the total content of precipitating metal ions in the extract is between about 90% and about 150% of that theoretically required for complete combination with the aconitic acid; and wherein the amount of precipitating metal ion selected from the group consisting of barium and strontium is between about 8% and about 20% of that theoretically required for complete combination with the aconitic acid.

3. The process of recovering aconitic acid values from aconitic acid-containing plant extracts which comprises substantially neutralizing said extract, providing in said extract precipitating metal ions, in an amount between about 80% and about 250% of that theoretically required for complete combination with the aconitic acid, at least a portion of which precipitating metal ions is a metal selected from the group consisting of barium and strontium in an amount between about 5% and about 40% of that theoretically required for complete combination with the aconitic acid, to precipitate aconitic acid values, at least a portion of which precipitated aconitic acid values is in the form of aconitic acid salts containing a metal selected from the group consisting of barium and strontium, and removing precipitated aconitic acid values from the extract.

4. The process of claim 3 wherein the total content of precipitating metal ions in the extract is between about 90% and about 150% of that theoretically required for complete combination with the aconitic acid, and wherein the amount of precipitating metal ion selected from the group consisting of barium and strontium provided in the extract is between about 8% and about 20% of that theoretically required for complete combination with the aconitic acid.

5. The process of recovering aconitic acid values from an aconitic acid-containing plant extract which comprises substantially neutralizing said extract, providing in said extract precipitating metal ions, in an amount between about 80% and about 250% of that theoretically required for complete combination with the aconitic acid, at least a portion of which precipitating metal ions is a metal selected from the group consisting of barium and strontium, in an amount between about 5% and about 40% of that theoretically required for complete combination with the aconitic acid, to precipitate aconitic acid values at least a portion of which precipitated aconitic acid values is in the form of aconitic acid salts containing a metal selected from the group consisting of barium and strontium, permitting the mixture to stand until no further significant crystal growth takes place, and removing precipitated aconitic acid values from the extract.

6. The process of recovering aconitic acid values from aconitic acid plant extracts which comprises adding lime to said extract to adjust the pH thereof to within the substantially neutral range, supplying to said extract precipitating metal ions at least a portion of which is a metal selected from the group consisting of barium and strontium, to provide a total content of precipitating metal ions in said extract of between about 80% and about 250% of that theoretically required for complete combination with the aconitic acid, and a metal ion selected from the group consisting of barium and strontium in an amount between about 5% and about 40% of that theoretically required for complete combination with the aconitic acid, to precipitate aconitic acid values at least a portion of which precipitated aconitic acid values is in the form of aconitic acid salts containing a metal selected from the group consisting of barium and strontium, and removing precipitated aconitic acid values from the extract.

7. The process of claim 6 wherein the extract containing the precipitated aconitic acid values is permitted to stand until no further significant crystal growth takes place before precipitated aconitic acid values are removed from the extract.

8. The process of recovering aconitic acid values from an aconitic acid-containing plant extract which comprises adjusting the pH of said extract to within the substantially neutral range with lime, adding to said substantially neutralized extract a water soluble salt selected from the group consisting of water-soluble calcium and magnesium salts and a water-soluble salt selected from the group consisting of the water-soluble barium and strontium salts to provide a total content of metal ions selected from the group consisting of calcium, magnesium, barium, and strontium ions present in said extract corresponding to between about 80% and about 250% of that theoretically required for complete combination with the aconitic acid present, and a content of metal ions selected from the group consisting of barium and strontium ions corresponding to between about 5% and about 40% of that theoretically required for complete combination with the aconitic acid, permitting said extract to stand until no further significant crystal growth occurs, and removing precipitated aconitic acid values from the extract.

9. The process of claim 8 wherein the aconitic acid-containing plant extract is molasses.

10. The process of recovering aconitic acid values from an aconitic acid-containing plant extract which comprises adjusting the pH of the extract to within the substantially neutral range with lime at a temperature below about 55° C., heating said substantially neutralized extract to a temperature between about 85° C. and the boiling point, adding a water-soluble calcium salt, permitting the extract to stand until no further significant crystal growth occurs, adding a water-soluble barium salt, the said lime, calcium salt and barium salt providing in the extract precipitating metal ions in an amount between about 80% and about 250% of that theoretically required for complete combination with said aconitic acid, and said barium salt providing barium ions in an amount between about 5% and about 40% of that theoretically required for complete combination with said aconitic acid, permitting the extract to stand until no further significant crystal growth occurs, and removing precipitated aconitic acid values from the extract.

11. The process of claim 10 wherein the lime, calcium salt and barium salt provides a total precipitating metal ion content present in said extract between about 90% and about 150% of that theoretically required for complete combination with the aconitic acid, and an amount of barium ions corresponding to between about 8% and about 20% of that theoretically required for complete combination with the aconitic acid.

12. The process of claim 11 wherein the aconitic acid-containing plant extract is molasses diluted to a specific gravity between about 45° and about 60° Brix.

13. The process of recovering aconitic acid values from an aconitic acid-containing plant extract which comprises adjusting the pH of said extract to within the substantially neutral range with lime at a temperature below about 55° C., heating said substantially neutralized extract to a temperature between about 85° C. and the boiling point, adding a water-soluble barium salt to precipitate aconitic acid values at least a portion of which aconitic acid values is in the form of an aconitic acid salt containing barium, the said lime and barium salt providing precipitating metal ions in an amount between about 80% and about 250% of that theoretically required for complete combination with said aconitic acid, and said barium salt providing barium ions in an amount between about 5% and about 40% of that theoretically required for complete combination with said aconitic acid, and removing the precipitated aconitic acid values from the extract.

14. The process of claim 13 wherein the lime and barium salt provide a total precipitating metal ion content present in said extract between about 90% and about 150% of that theoretically required for complete combination with the aconitic acid, and an amount of barium ions corresponding to between about 8% and about 20% of that theoretically required for complete combination with the aconitic acid.

15. The process of claim 13 wherein the aconitic acid-containing plant extract is molasses diluted to a specific gravity between about 45° and about 60° Brix.

DONALD WALTER COLLIER.

(References on following page)

REFERENCES CITED

The following references are of record in the file of this patent:

UNITED STATES PATENTS

| Number | Name | Date |
|---|---|---|
| 2,280,085 | Ventre et al. | Apr. 28, 1942 |
| 2,345,079 | Ventre et al. | Mar. 28, 1944 |
| 2,359,537 | Ventre et al. | Oct. 3, 1944 |
| 2,432,223 | Ambler et al. | Dec. 9, 1947 |

OTHER REFERENCES

Ventre et al., Ind. and Eng. Chem., vol. 38, pp. 201–204 (1946).